(12) United States Patent
Bae et al.

(10) Patent No.: US 10,198,107 B2
(45) Date of Patent: Feb. 5, 2019

(54) TERMINAL DEVICE AND CONTROL METHOD THEREFOR

(71) Applicants: Samsung Electronics Co., Ltd., Suwon-si, Gyeonggi-do (KR); IIIT HYDERABAD, Hyderabad (IN)

(72) Inventors: Yu-dong Bae, Suwon-si (KR); Eun-hwa Lee, Suwon-si (KR); Indurkhya Bipin, Hyderabad (IN); Akshita, Hyderabad (IN); Sampath Harini, Hyderabad (IN)

(73) Assignees: Samsung Electronics Co., Ltd., Suwon-si (KR); IIIT HYDERABAD, Hyderabad (IN)

( * ) Notice: Subject to any disclaimer, the term of this patent is extended or adjusted under 35 U.S.C. 154(b) by 25 days.

(21) Appl. No.: 15/512,329

(22) PCT Filed: Feb. 10, 2015

(86) PCT No.: PCT/KR2015/001350
§ 371 (c)(1),
(2) Date: Mar. 17, 2017

(87) PCT Pub. No.: WO2016/043390
PCT Pub. Date: Mar. 24, 2016

(65) Prior Publication Data
US 2017/0277330 A1    Sep. 28, 2017

(30) Foreign Application Priority Data
Sep. 19, 2014 (KR) .................. 10-2014-0124882

(51) Int. Cl.
G06F 3/00    (2006.01)
G06F 3/041   (2006.01)
G06F 3/01    (2006.01)

(52) U.S. Cl.
CPC ............. G06F 3/0414 (2013.01); G06F 3/01 (2013.01); G06F 3/016 (2013.01); *G06F 2203/011* (2013.01)

(58) Field of Classification Search
CPC ... G06F 3/0414; G06F 3/016; G06F 2203/011
See application file for complete search history.

(56) References Cited

U.S. PATENT DOCUMENTS 7,765,182 B2    7/2010  Peurach et al.
2008/0153554 A1 6/2008  Yoon et al.
(Continued)

OTHER PUBLICATIONS

Peter J. Lang et al., International Affective Picture System (ZAPS): Affective ratings of pictures and instruction manual, Technical Report A-8, 2008, NIMH Center for the Study of Emotion & Attention, University of Florida, Gainesville, FL.
(Continued)

*Primary Examiner* — Muhammad N Edun
(74) *Attorney, Agent, or Firm* — Jefferson IP Law, LLP

(57) ABSTRACT

Disclosed is a terminal device. The terminal device includes a haptic unit for providing a haptic effect by changing at least one of frequency, strength, wavelength, and rhythm, an input unit for receiving information corresponding to an emotional state, and a controller for controlling the haptic unit so that a haptic effect of the emotional state corresponding to the received information is provided to a user.

13 Claims, 6 Drawing Sheets

(56) References Cited

U.S. PATENT DOCUMENTS

| | | | |
|---|---|---|---|
| 2013/0063256 A1 | 3/2013 | Tartz et al. | |
| 2013/0225261 A1 | 8/2013 | Cruz-Hernandez | |
| 2014/0253303 A1 | 9/2014 | Levesque | |
| 2014/0267076 A1 | 9/2014 | Birnbaum et al. | |
| 2014/0318699 A1* | 10/2014 | Longinotti-Buitoni | A61B 5/0002 156/247 |
| 2015/0019682 A1* | 1/2015 | Lim | H04L 67/327 709/217 |
| 2018/0144480 A1* | 5/2018 | Saboune | H04N 9/79 |

OTHER PUBLICATIONS

Margaret M. Bradley et al., The International Affective Digitized Sounds (2nd Edition; IADS-2): Affective Ratings of Sounds and Instruction Manual, Technical Report B-3, 2007, NIMH Center for the Study of Emotion & Attention, University of Florida, Gainesville, FL.

Emmanuel Dellandrea et al., Classification of affective semantics in images based on discrete and dimensional models of emotions, 978-1-4244-8027-2/10, 2010, Liris, France.

Frank A Geldard, Some Neglected Possibilities of Communication, vol. 131, No. 3413, May 27, 1960, http://science.sciencemag.org.

Lorna M. Brown et al., Feel Who's Talking: Using Tactons for Mobile Phone Alerts, ACM 1-59593-298-4/06/0004, CHI 2006, Apr. 22-27, 2006, Motreal, Quebec, Canada.

Chandrika Jayant et al., VBraille: Haptic Braille Perception using a Touch-screen and Vibration on Mobile Phones ACM 978-1-60558-881-0/10/10, Asset 2010, Oct. 25-27, 2010, Orlando, Florida, USA.

Tomoya Yamada et al., Wearable Olfactory Display: Using Odor in Outdoor Environment, Mar. 25-29, 2006, 1-4244-0224-7/06, IEEE Virtual Reality 2006, Alexandria, Virginia, USA.

Dzmitry Tsetserukou et al., iFeel_IM: Innovative Real-Time Communication System with Rich Emotional and Haptic Channels, Apr. 10-15, 2010, ACM 978-1-60558-930-5/10/04, CHI 2010, Atlanta, Georgia, USA.

Steve Yohanan et al., Hapticat: Exploration of Affective Touch, Oct. 4-6, 2005, ACM 1-59593-028-0/05/0010, ICMI 2005, Trento, Italy.

Hasti Seifi et al., A First Look at Individuals Affective Ratings of Vibrations, Apr. 14-18, 2013, 978-1-4799-0088-6/13, IEEE World Haptics Conference 2013, Daejeon, Korea.

James A. Russell, A Circumplex Model of Affect, 0022-3514/80/3906-1161, 1980, Joural of Personality and Social Psychology, vol. 39, No. 6, 1161-1178.

David Ternes et al., Designing Large Sets of Haptic Icons with Rhythm, pp. 199-208, 2008, EuroHaptics 2008, Springer-Verlag Berlin Heidelberg 2008.

Stephen A. Brewster et al., Non-Visual Information Display Using Tactons, Apr. 24-29, 2004, ACM 1-58113-703-6/04/0004, CHI 2004, Vienna, Austria.

* cited by examiner

FIG. 2

TERMINAL DEVICE AND CONTROL METHOD THEREFOR

TECHNICAL FIELD

The present general inventive concept generally relates to a terminal device and a method for controlling the same, and more particularly, to a terminal device that generates various stimuli for inducing a user's emotion and a method for controlling the same.

BACKGROUND OF THE INVENTION

With the development of electronic technologies, interaction methods between a machine and a user have become diverse. As an example, a terminal device was able to provide a user with a haptic effect such that the user can feel a tactile stimulus from the terminal device.

For example, the haptic effect of the terminal device may include a feedback for notifying that a message was received, a feedback for notifying that a button was pressed, a feedback for alerting a user with impaired vision, a feedback for giving a user a feeling of virtual reality in a game, and so on.

As described above, the main purpose of the haptic effect in the related art was limited to alerting a user. That is, the haptic effect was only a function of giving a general notification from a machine to the user, and thus, it cannot be seen that the haptic effect is an interaction between a machine and a user in a real sense.

Meanwhile, with the growing interest in a Human-Computer Interaction (HCI) method, various studies on an interaction means for enhancing user's cognitive, emotional, and life experiences have been conducted. Specially, there have been studies on an interaction method for inducing a user's particular emotion, but the studies focused on only the interactions by a user's vision and hearing.

In other words, the HCI in a real sense, that is, an interaction using other senses than the vision and hearing, a tactile sensation above all, had never been tried. As user's needs for the HCI are becoming more diverse, there is a necessity for a method for enabling the HCI in a more novel way.

DETAILED DESCRIPTION OF THE INVENTION

Technical Purpose

The present disclosure has been provided to address the aforementioned and other problems and disadvantages occurring in the related art, and an aspect of the present disclosure provides a terminal device that generates various stimuli for inducing a user's emotion and a method for controlling the same.

Means for Solving Problems

According to an embodiment of the present disclosure, there is provided a terminal device. The device includes a haptic unit configured to provide a haptic effect by changing at least one of frequency, strength, wavelength, and rhythm, an input unit configured to receive information corresponding to an emotional state, and a control unit configured to control the haptic unit to provide a user with a haptic effect of the emotional state corresponding to the received information.

The device may further include a storage configured to store a plurality of emotional states and a haptic condition corresponding to each of the plurality of emotional states. The control unit may control the haptic unit to provide the haptic effect according to a haptic condition of the emotional state corresponding to the received information.

The device may further include a display configured to display an image. The control unit may extract feature data of an image, determine an emotional state of the image based on the extracted feature data, display the image in the display, and in response to determining that there is a difference between the emotional state corresponding to the received information and the determined emotional state of the image, control the haptic unit to provide a haptic effect for compensating for the difference while the image is displayed.

The emotional state may be defined as a combination of a first parameter value indicating a degree of excitement and a second parameter value indicating a degree of pleasure. In response to a first parameter value defining the emotional state of the image being lower than a first parameter value defining the emotional state corresponding to the received information, the control unit may control the haptic unit to provide a haptic effect corresponding to an emotional state defined as a first parameter value between the first parameter value defining the emotional state of the image and the first parameter value defining the emotional state corresponding to the received information.

The device may further include a speaker configured to output sound. The control unit may extract feature data of sound, determine an emotional state of the sound based on the extracted feature data, output the sound through the speaker, and in response to determining that there is a difference between the emotional state corresponding to the received information and the determined emotional state of the sound, control the haptic unit to provide a haptic effect for compensating for the difference while the sound is outputted.

The device may further include a display configured to display an image. The emotional state may be defined as a combination of a first parameter value indicating a degree of excitement and a second parameter value indicating a degree of pleasure. In response to determining that there is a difference between a second parameter value defining an emotional state of the haptic effect provided by the haptic unit between a second parameter value defining the emotional state corresponding to the received information, the control unit may display an image corresponding to an emotional state defined as a second parameter value between the second parameter value defining the emotional state of the provided haptic effect and the second parameter value defining the emotional state corresponding to the received information, through the display.

The input unit may receive haptic contact information. The control unit may control the haptic unit to provide the user with the haptic effect of the emotional state corresponding to the received information based on the haptic contact information.

According to an embodiment of the present disclosure, there is provided a method for controlling a terminal device with a haptic unit for providing a haptic effect by changing at least one of frequency, strength, wavelength, and rhythm. The method includes receiving information corresponding to an emotional state and controlling the haptic unit to provide a user with a haptic effect of the emotional state corresponding to the received information.

The method may further include storing a plurality of emotional states and a haptic condition corresponding to each of the plurality of emotional states. The controlling may include controlling the haptic unit to provide the haptic effect according to a haptic condition of the emotional state corresponding to the received information.

The method may further include extracting feature data of an image and determining an emotional state of the image based on the extracted feature data and displaying the image. In response to determining that there is a difference between the emotional state corresponding to the received information and the determined emotional state of the image, the controlling may include controlling the haptic unit to provide a haptic effect for compensating for the difference while the image is displayed.

The emotional state may be defined as a combination of a first parameter value indicating a degree of excitement and a second parameter value indicating a degree of pleasure. In response to a first parameter value defining the emotional state of the image being lower than a first parameter value defining the emotional state corresponding to the received information, the controlling may include controlling the haptic unit to provide a haptic effect corresponding to an emotional state defined as a first parameter value between the first parameter value defining the emotional state of the image and the first parameter value defining the emotional state corresponding to the received information.

The method may further include extracting feature data of sound and determining an emotional state of the sound based on the extracted feature data and outputting the sound. In response to determining that there is a difference between the emotional state corresponding to the received information and the determined emotional state of the sound, the controlling may include controlling the haptic unit to provide a haptic effect for compensating for the difference while the sound is outputted.

The emotional state may be defined as a combination of a first parameter value indicating a degree of excitement and a second parameter value indicating a degree of pleasure. In response to determining that there is a difference between a second parameter value defining an emotional state of the haptic effect provided by the haptic unit between a second parameter value defining the emotional state corresponding to the received information, the method may further include displaying an image corresponding to an emotional state defined as a second parameter value between the second parameter value defining the emotional state of the provided haptic effect and the second parameter value defining the emotional state corresponding to the received information.

The method may further include receiving haptic contact information. The controlling may include controlling the haptic unit to provide the user with the haptic effect of the emotional state corresponding to the received information based on the haptic contact information.

The method may further include determining at least one of frequency, strength, wavelength, and rhythm in which the haptic unit operates. The controlling may include controlling the haptic unit to provide the user with the haptic effect of the emotional state corresponding to the received information based on a determined result.

According to an embodiment of the present disclosure, there is provided a computer readable medium including a program for executing a method for controlling a terminal device with a haptic unit for providing a haptic effect by changing at least one of frequency, strength, wavelength, and rhythm. The method includes receiving information corresponding to an emotional state and controlling the haptic unit to provide a user with a haptic effect of the emotional state corresponding to the received information.

Effects of the Invention

According to the above-described various embodiments of the present disclosure, it is possible to control a user's emotional state through a terminal device.

BRIEF DESCRIPTION OF DRAWINGS

FIG. 2 is a diagram provided to describe a rhythm provided by a haptic unit of a terminal device according to an embodiment disclosed herein;

DETAILED DESCRIPTION OF PREFERRED EMBODIMENT

Certain embodiments are described below in greater detail with reference to the accompanying drawings. The present disclosure may have several embodiments, and the embodiments may be modified variously. In the following description, specific embodiments are provided with accompanying drawings and detailed descriptions thereof. However, it should be noted that the the embodiments do not limit the scope of the invention of the present disclosure to any particular embodiment and include all modifications, equivalents, and/or replacements that belong to the range of a technical concept and a technical scope disclosed herein. When it is determined that a detailed description on a publicly-known related art may obscure the gist of the present disclosure unnecessarily, the detailed description will be omitted.

In the following description, a term including an ordinal, for example, 'first' or 'second,' may be used to distinguish elements, but the elements are not limited by the ordinal. The ordinal is used to only distinguish the same or similar elements.

The terms used in the following description are provided to describe specific embodiments and are not intended to limit the scope of right of the present disclosure. A term in a singular form includes a plural form unless it is intentionally written that way. Further, a term, such as, 'include,' 'consist of,' or the like, refers to the disclosed features, numbers, steps, operations, elements, parts, or combinations thereof and is not intended to exclude any possibilities of existence or addition of one or more other features, numbers, steps, operations, elements, parts, or combinations thereof.

In the following description, a term 'module' or 'unit' refers to an element that performs at least one function or operation. The 'module' or 'unit' may be realized as hardware, software, or combinations thereof. A plurality of 'modules' or 'units' may be integrated into at least one module or chip and realized as at least one processor (not shown), except for a case where respective 'modules' or 'units' need to be realized as discrete specific hardware.

Figure 1:
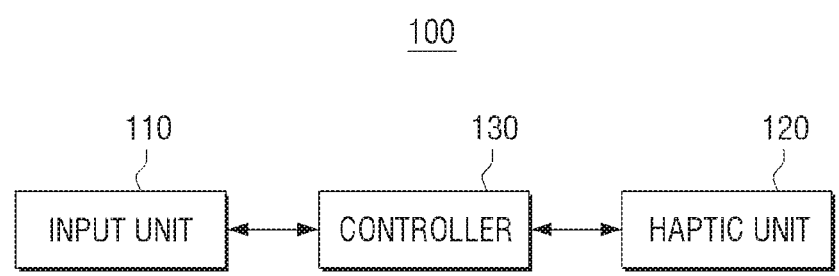
FIG. 1 is a block diagram illustrating a structure of a terminal device according to an embodiment disclosed herein.

FIG. 1 is a block diagram illustrating a structure of a terminal device according to an embodiment disclosed herein.

Referring to FIG. 1, a terminal device 100 may include an input unit 110, a haptic unit 120, and a controller 130.

The terminal device 100 may be realized as any kind of devices capable of accommodating a vibrator or an electricity generator for stimulating a user's tactile sensation. By way of example, the terminal device 100 may be realized as a mobile phone, a Personal Digital Assistant (PDA), a smart phone, an electronic notebook, a smart pad, a massager, an acupressure device, or the like. The terminal device 100 may receive information corresponding to an emotional state from a user and generate a haptic effect corresponding to the received information. That is, the terminal device 100 may provide the user with a haptic effect for inducing a target emotion.

The input unit 110 receives diverse inputs for controlling the terminal device 100. The input unit 110 may receive the information corresponding to an emotional state. The input unit 110 may be realized as various input means, such as, a mouse, a keyboard, a touch screen, a microphone, or the like. The input of the information corresponding to the emotional state described herein may include any kind of inputs, for example, text, images, voices, or the like.

The haptic unit 120 generates a haptic effect. The haptic effect refers to an effect of stimulating a user's tactile sensation. For example, the haptic unit 120 may include an actuator. The actuator may be supplied with energy in a form of an electric current, a hydraulic power, or a voltage from an energy source and convert the supplied energy to a motion, such as, a vibration.

To be specific, the haptic unit 120 may provide a haptic effect by changing at least one of frequency, strength, wavelength, and rhythm according to control of the controller 130.

Figure 2:
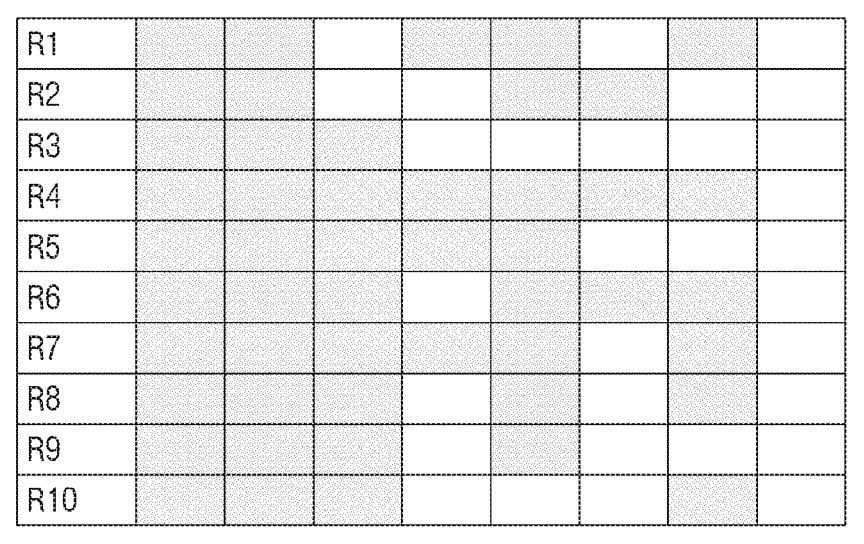

FIG. 2 is a diagram provided to describe a rhythm provided by the haptic unit 120 according to an embodiment disclosed herein. As illustrated in FIG. 2, a plurality of rhythm patterns (R1 to R10) may be stored in a storage of the terminal device 100. In FIG. 2, each box indicates duration, dark parts indicate that there is a vibration, and bright parts indicate that there is no vibration.

According to an embodiment disclosed herein, the haptic unit 120 may generate a plurality of different waveforms. For example, the haptic unit 120 may generate three waveforms of a sine wave, a sawtooth wave, and a pulse wave.

According to an embodiment disclosed herein, the haptic unit 120 may generate different frequencies. For example, the haptic unit 120 may generate three frequencies of 55 Hz, 110 Hz, and 165 Hz.

Further, according to an embodiment disclosed herein, the haptic unit 120 may generate different strengths. For example, the haptic unit 120 may generate two strengths of 20 dB and 35 dB.

Accordingly, the haptic unit 120 may generate various haptic effects through a combination of different rhythms, waveforms, frequencies, and strengths.

The function of generating a tactile stimulus of the haptic unit 120 may be defined by at least one of the frequency, strength, wavelength, and rhythm ranges in which the haptic unit 120 may operate and may vary depending upon each terminal device. The information on the function of generating a tactile stimulus of the haptic unit 120 may be stored in a storage (not shown). The controller 130 may control the haptic unit 120 to generate a haptic effect corresponding to an intended emotional state based on the stored information. That is, a haptic condition for generating a haptic effect with respect to the same target emotional state may vary in each terminal device.

The controller 130 controls overall operations of the terminal device 100. Specially, the controller 130 may control the haptic unit 120 to provide the user with a haptic effect of an emotional state corresponding to the information received through the input unit 110.

To be specific, the controller 130 may analyze data included in the received information and determine which emotional state among a plurality of emotional states corresponds to the received information. According to an embodiment disclosed herein, the storage stores information on the plurality of emotional states, and the respective emotional states may be defined as different combinations of the quantified degree of excitement and degree of pleasure.

Further, the storage stores a plurality of haptic conditions corresponding to each of the plurality of emotional states. The controller 130 may control the haptic unit 120 to provide a haptic effect according to a haptic condition of the emotional state corresponding to the information received through the input unit 110.

Standards of distinction for the plurality of emotional states may be determined variously depending upon an developer's intention of applying the present disclosure to the terminal device 100. Hereinafter, an example of the standards of distinction will be described with reference to FIG. 3.

Figure 3:
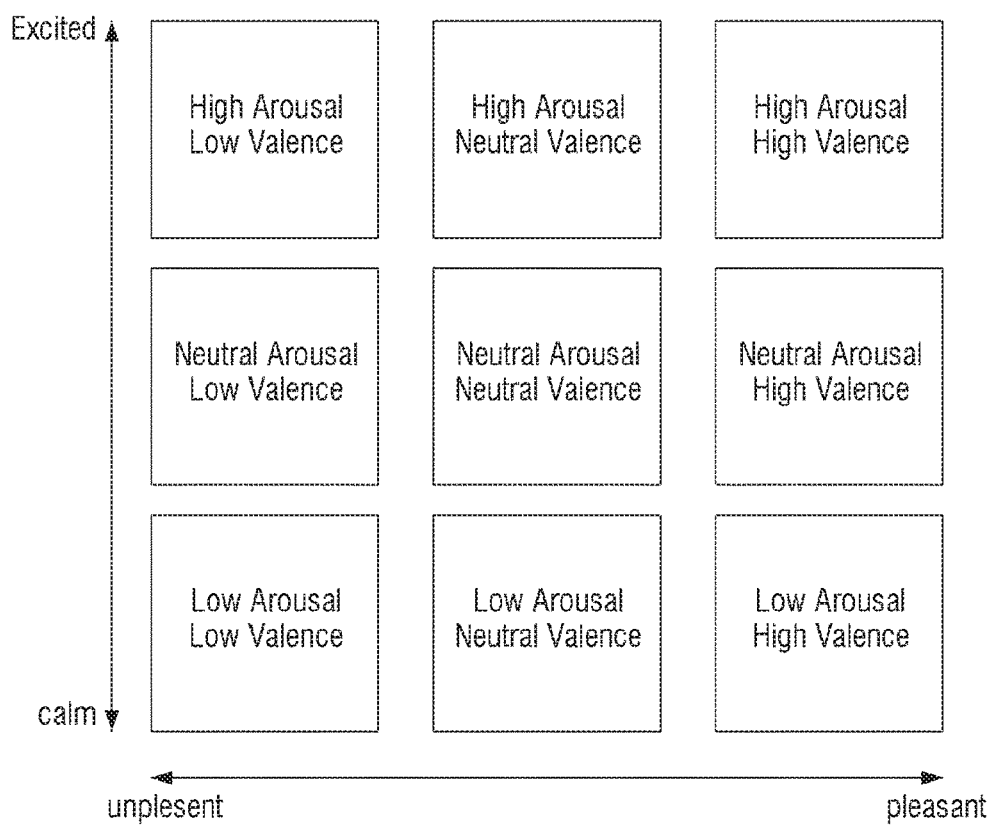
FIG. 3 is a diagram provided to describe standards of distinction for an emotional state according to an embodiment disclosed herein.

Referring to FIG. 3, the plurality of emotional states are defined in a two-dimensional (2D) space parameterized by a degree of Valence (indicating whether a user is pleasant or unpleasant, that is, a degree of pleasure) and a degree of Arousal (indicating whether the user becomes excited or becomes calm, that is, a degree of excitement). A plurality of haptic conditions are mapped onto the plurality of emotional states defined above and stored in the storage.

To be specific, the plurality of haptic conditions are different in terms of at least one of the frequency, strength, wavelength, and rhythm. In order to construct a database where the plurality of haptic conditions are mapped onto the plurality of emotional states, an experiment of several subjects may be conducted. In the experiment, a haptic effect corresponding to each haptic condition is provided to the subjects, and each subject is instructed to select an emotional state that he/she believes as corresponding to the provided haptic effect, from among the plurality of emotional states classified as illustrated in FIG. 3. Based on a result of the experiment, a corresponding relation between the plurality of haptic effects and the emotional states may be determined. A database for the result may be stored in the storage of the terminal device 100.

The controller 130 may store the database according to the experiment in the storage and use it. Further, the controller 130 may update the database adaptably through an interaction between the terminal device 100 and the user. By way of example, in response to receiving a user's command to map the haptic effects onto the emotional states, the controller 130 may control the haptic unit 120 to provide the user with the plurality of haptic effects with predetermined time intervals according to the plurality of pre-stored haptic conditions. When providing the haptic effects, the controller 130 may display a User Interface (UI) screen for receiving a selection as to which emotional state corresponds to the provided haptic effects (for example, a UI screen including the image of FIG. 3) in the display (not shown) of the terminal device 100. The user may select any one of the plurality of emotional states displayed in the UI screen every time each haptic effect is provided. The controller 130 may update the database stored in the storage based on the user's inputs.

The database is stored in the storage of the terminal device 100. In response to receiving the information corresponding to an emotional state, the controller 130 may control the haptic unit 120 to provide a haptic effect mapped onto the emotional state corresponding to the received information based on the stored database. In this case, according to an embodiment disclosed herein, the controller 130 may display a UI screen including the image of FIG. 3 in the display of the terminal device 100 in order to receive the information corresponding to the emotional state from the user.

According to another embodiment, the terminal device 100 may receive various forms of inputs, such as, text, images, sounds, or the like, through the input unit 110. The controller 130 may analyze the received information and determine which emotional state among the plurality of emotional states corresponds to the received information. By way of example, the storage of the terminal device 100 may store a voice recognition program. In response to receiving a voice "Make me feel good" through the input unit 110 realized as a microphone, the controller 130 may analyze a construction of the received voice, convert the voice to text information, and determine an emotional state corresponding to the received voice based on the pre-stored information on matching of text and an emotional state. Then, the controller 130 may control the haptic unit 120 to provide the haptic effect of the determined emotional state.

Meanwhile, the emotional states and the haptic effects are not necessarily matched one to one, and the information on the plurality of haptic effects corresponding to one emotional state may be stored in the storage. Accordingly, the controller 130 may control the haptic unit 120 to provide any one of the plurality of haptic effects of the emotional state corresponding to the received information. Further, the controller 130 may control the haptic unit 120 to provide the plurality of different haptic effects corresponding to one emotional state with the predetermined time intervals. Accordingly, the user may receive diverse stimuli corresponding to one emotional state.

Figure 4:
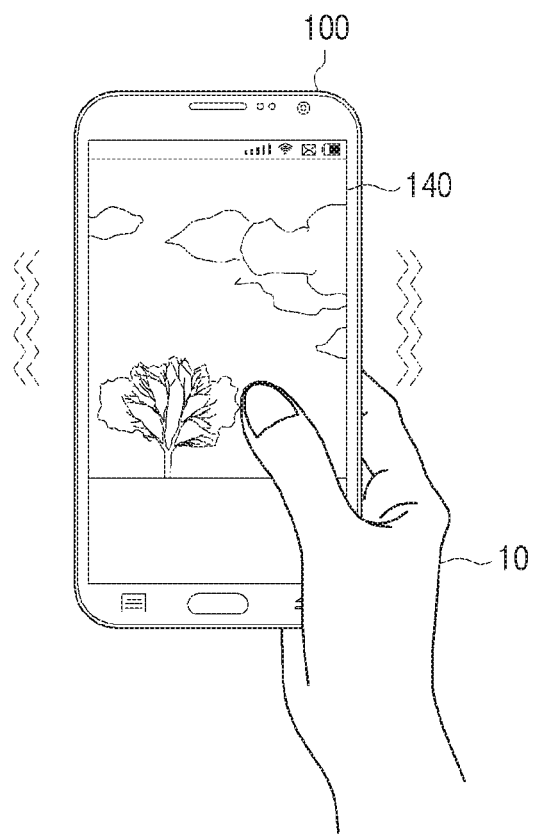
FIGS. 4 and 5 are diagrams illustrating terminal devices according to various embodiments disclosed herein.

According to an embodiment disclosed herein, the terminal device 100 may determine an emotional state of an image. In response to determining that there is a difference between the emotional state of the image and an intended emotional state (an emotional state corresponding to the information received through the input unit 110, that is, a target emotional state), the terminal device 100 may provide the user with a haptic effect for compensating for the difference while the image displayed. Referring to FIG. 4, in response to determining that there is a difference between the emotional state of the image and the target emotional state while the image is displayed in the display 140, the controller 130 may control the haptic unit 120 to provide a user 10 with a vibration, that is, a haptic effect for compensating for the difference.

For doing this, the controller 130 may extract feature data from the image and determine the emotional state of the image based on the extracted feature data. As an example, in response to receiving a command to display an image, the controller 130 displays the image in the display 140 and determines the emotional state of the image. In response to the displayed image being an image of a user's face, for example, the controller 130 may extract a face area from the image based on color information, divide the extracted face area into a plurality of blocks, extract a feature vector from the plurality of blocks, and analyze a look, such as, frowning eyes or raising a mouth corner. That is, the controller 130 may determine the emotional state of the image based on the analysis. As another example, the controller 130 may determine the emotional state of the image by analyzing the color information included in an image frame of the image. In general, the colors in tones of green or blue tranquilize a human's emotion, and thus, an image consisting of a frame in which green or blue predominates may be determined to have a calm emotional state (for example, the emotional states arranged at a lower side with reference to a horizontal axis of FIG. 3). By contrast, an image consisting of a frame in which red predominates may be determined to have an excited emotional state (for example, the emotional states arranged at an upper side with reference to the horizontal axis of FIG. 3).

Further, the controller 130 may determine the emotional state of the image based on the information on the emotional state of the image. For example, it is assumed that the terminal device 100 is realized as a mobile phone capable of transmitting and receiving a message. In this case, a user of a transmitting terminal device may send a message including an image along with information on an emotional state of the image. By way of example, the transmitting terminal device may provide the user with a menu for setting an emotional state of the image to be sent (for example, an icon for setting an emotional state of joy, sorrow, depression, or the like). A receiving terminal device may determine the emotional state of the image based on the information on the emotional state of the received image.

The storage of the terminal device 100 pre-stores a plurality of images having predetermine emotional states. In response to receiving the information corresponding to an emotional state, that is, a target emotional state, from the user, the controller 130 may display a random image among the plurality of pre-stored images in the display 140 or display an image having an emotional state which is the most similar to the target emotional state in the display 140.

The controller 130 determines the emotional state of the image and calculates a difference between the target emotional state and the determined emotional state of the image. As described above, the emotional state may be parameterized and quantified, and thus, the difference in the emotional states may be calculated by calculating a difference in the numerical values indicating the respective emotional states. In response to determining that the difference between the target emotional state and the emotional state of the image is less than a predetermined difference, the difference may be regarded as non-existence. Accordingly, a process for compensating for the difference may not be performed.

In response to determining that the difference needs to be compensated, the controller 130 may provide the user with a haptic effect for compensating for the calculated difference through the haptic unit 120. To be specific, as illustrated in FIG. 4, the controller 130 may provide the user with the haptic effect for compensating for the difference between the emotional state of the image and the emotional state corresponding to the received information through the haptic unit 120 while the image is displayed in the display 140.

According to the following exemplary method, the haptic effect for compensating for the difference between the target emotional state and the emotional state of the image may be provided.

In an experiment of several subjects, the inventor defined an emotional state by two parameters, the degree of excitement (Arousal) and the degree of pleasure (Valence) and provided the subjects with only an image or provided an image and a haptic stimulus at the same time. According to this experiment, it turned out that giving the image and the haptic stimulus at the same time results in greater excitement. This experiment result suggests that the haptic stimulus increases a degree of excitement of a visual stimulus. That is, a target emotional state may be induced by providing the visual stimulus and the haptic stimulus at the same time. Accordingly, it is possible to compensate for the difference between the emotional state of the image and the target emotional state by using the haptic effect.

To be specific, in response to an Arousal parameter value defining the emotional state of the image being lower than an Arousal parameter value defining the emotional state corresponding to the information received through the input unit 110 (target emotional state), the controller 130 may control the haptic unit 120 to provide a haptic effect corresponding to an emotional state defined as an Arousal parameter value between the Arousal parameter value defining the emotional state of the image and the Arousal parameter value defining the target emotional state.

In the above embodiment, the difference in the emotional states is compensated by the haptic effect. Meanwhile, according to another embodiment disclosed herein, the difference between the emotional state of the haptic effect and the target emotional state may be compensated by a visual stimulus through an image.

According to the following exemplary method, the display 140 may display an image for compensating for the difference between the emotional state of the haptic effect and the target emotional state.

In an experiment of several subjects, the inventor defined an emotional state by two parameters, the degree of excitement (Arousal) and the degree of pleasure (Valence) and provided the subjects with only a haptic stimulus or provided an image and a haptic stimulus at the same time. According to the experiment, it turned out that giving the image and the haptic stimulus at the same time results in greater pleasure. This experiment result suggests that an image, that is, a visual stimulus increases a degree of pleasure of a tactile stimulus.

That is, a target emotional state may be induced by providing a visual stimulus and a haptic stimulus at the same time. Accordingly, it is possible to compensate for the difference between the emotional state of the haptic effect and the target emotional state by using an image.

To be specific, in response to determining that there is a difference between a Valence parameter value defining the emotional state of the haptic effect provided by the haptic unit 120 and a Valence parameter value defining the emotional state corresponding to the information received through the input unit 110 (target emotional state), the controller 130 may display an image corresponding to an emotional state defined as a Valence parameter value between the Valence parameter value defining the emotional state of the provided haptic effect and the Valence parameter value defining the target emotional state, through the display 140.

In the above embodiment, the target emotional state is induced by a combination of the visual stimulus and the haptic stimulus. From the similar standpoint, the target emotional state may be induced by a combination of an auditory stimulus and a haptic stimulus. This embodiment will be described below in further details.

According to still another embodiment disclosed herein, the terminal device 100 may further include a speaker (not shown). Further, the terminal device 100 may determine an emotional state of sound. In response to determining that there is a difference between the emotional state of the sound and an intended emotional state (an emotional state corresponding to the information received through the input unit 110, that is, a target emotional state), the terminal device 100 may provide the user with a haptic effect for compensating for the difference while the sound is outputted. In other words, in response to determining that there is a difference between the emotional state of the outputted sound and the target emotional state while the sound is outputted through the speaker connected to the terminal device 100, the controller 130 may control the haptic unit 120 to provide the user with a vibration, that is, a haptic effect for compensating for the difference.

For doing this, the controller 130 may extract feature data from the sound and determine the emotional state of the sound based on the extracted feature data. For example, in response to receiving a command to output the sound, the controller 130 outputs the sound through the speaker and determines the emotional state of the sound. To be specific, the controller 130 may determine the emotional state of the sound by analyzing at least one of the feature data of the outputted sound, that is, frequency, waveform, strength, and rhythm. For example, in response to a weak strength or a slow rhythm of the sound, the controller 130 may determine that the sound corresponds to a calm emotional state (for example, the emotional states arranged at the lower side with reference to the horizontal axis of FIG. 3). By contrast, in response to a strong strength or a fast rhythm of the sound, the controller 130 may determine that the sound corresponds to an excited emotional state (for example, the emotional states arranged at the upper side with reference to the horizontal axis of FIG. 3).

Further, the controller 130 may determine the emotional state of the sound based on the information on the sound including information on a predetermined emotional state. As an example, the terminal device 100 may communicate with an external sever that provides music, and the external server may transmit the music to the terminal device 100 along with the information on an emotional state of the music. The terminal device 100 may receive the music and the information from the external server, and the controller 120 of the terminal device 100 may determine the emotional state of the music based on the information on the emotional state of the music.

The storage of the terminal device 100 may store a plurality of pieces of sound data where the emotional states are predetermined. In response to receiving the information corresponding to the emotional state, that is, the target emotional state, from the user, the controller 130 may output any random sound data among the plurality of pieces of sound data through the speaker or output the sound where the emotional state which is the most similar to the target emotional state is predetermined.

The controller 130 determines the emotional state of the sound and calculates a difference between the target emotional state and the emotional state of the sound. As described above, the emotional state may be parameterized and quantified, and thus, the difference in the emotional states may be calculated by calculating a difference in the numerical values indicating the respective emotional states.

The controller 130 may provide a haptic effect through the haptic unit 120 in order to compensate for the calculated difference. The method for compensating for a difference between an emotional state of sound and a target emotional state may be understood from the similar standpoint of the above-described method for compensating for a difference between an emotional state of an image and a target emotional state, and thus, a repeated description will be omitted.

As described above, the terminal device may induce a target emotional state by using a combination of a visual stimulus and a haptic stimulus and a combination of an auditory stimulus and a haptic stimulus. In this regard, it may be understood that the target emotional state may be also induced by a combination of a visual stimulus, an auditory stimulus, and a haptic stimulus. Accordingly, the embodiment may be applied to realize a terminal device capable of inducing an emotion by a combination of various stimuli. This embodiment may be understood with reference to FIG. 5.

Figure 5:
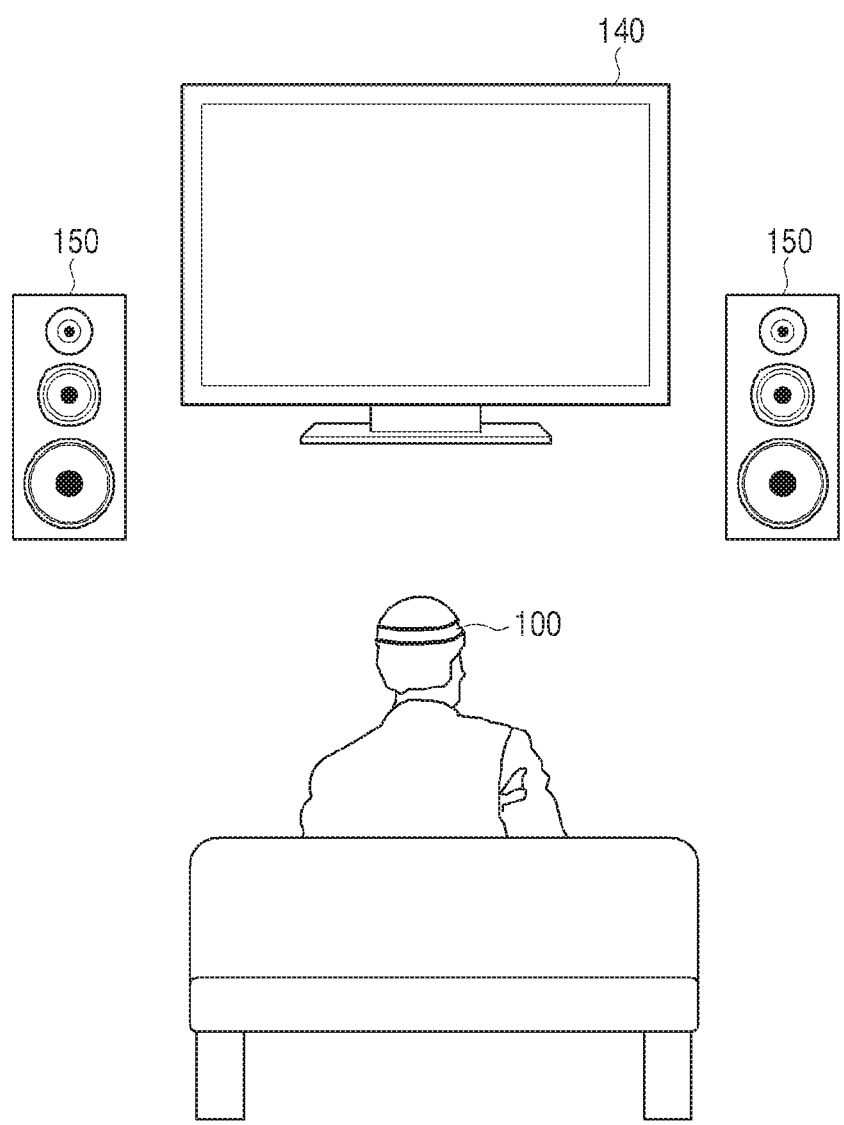

Referring to FIG. 5, the controller 130 of the terminal device 100 analyzes an emotional state where an emotional state of an image displayed in an external display device including the display 140 and an emotional state of sound outputted through the speaker 150 are combined. Further, the controller 130 of the terminal device 100 may control the haptic unit 120 to provide the user with a haptic effect for compensating for a difference between a target emotional state and the combined emotional states. In this case, the terminal device 100 may further include a communication interface (not shown) configured to communicate with an external device, such as, the speaker 150, in a wired and/or wireless manner.

The terminal device 100 may be realized as a wearable device in various forms. By way of example, as illustrated in FIG. 5, the terminal device 100 may be realized as various forms including a headband-type device that a user wears on a head, a watch-type device that a user puts on a wrist, a cloth-type device, and so on.

As described above, the terminal device 100 may be realized as diverse forms that may be in contact with any part of a user's body. A human body has sensitive parts and less sensitive parts, and the respective parts have different levels of tactile sensation. Accordingly, a haptic stimulus needs to be changed depending upon a location of the terminal device 100 on the body. For example, in response to the terminal device 100 coming into contact with a finger that is a sensitive part, the strength of the haptic effect may be adjusted to be weaker, and in response to the terminal device 100 coming into contact with a calf that is a less sensitive part, the strength of the haptic effect may be adjusted to be stronger, with respect to the same emotional state.

To be specific, according to an embodiment disclosed herein, the terminal device 100 may receive haptic contact information indicating a part of the user's body where the terminal device 100 will be arranged, through the input 110. The controller 130 may control the haptic unit 120 to provide the user with a haptic effect of a target emotional state based on the haptic contact information received through the input unit 110. For example, in response to determining that a contact location of the terminal device 100 is a finger based on the haptic contact information received through the input unit 110, the controller 130 may control the haptic unit 120 to provide a haptic effect with the strength suitable for the finger.

According to the above-described various embodiments, the terminal device 100 may induce an intended emotion.

Hereinafter, a method for controlling a terminal device will be described according to various embodiments disclosed herein.

Figure 6:
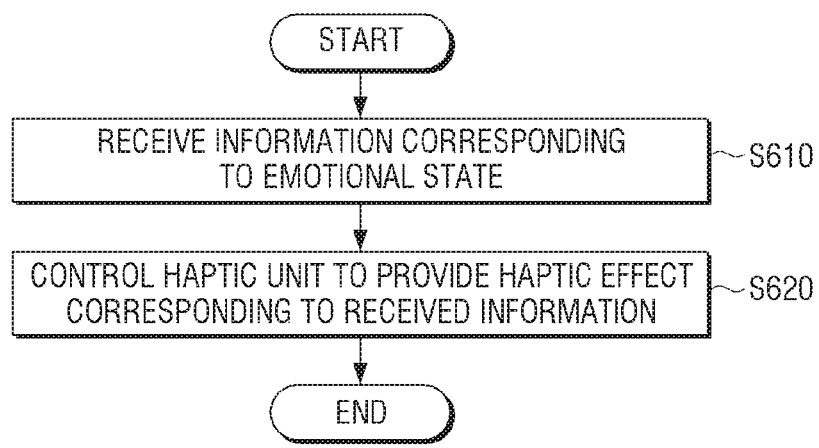
FIG. 6 is a flowchart provided to describe a method for controlling a terminal device according to an embodiment disclosed herein.

FIG. 6 is a flowchart provided to describe a method for controlling a terminal device with a haptic unit for providing a haptic effect by changing at least one of frequency, strength, wavelength, and rhythm, according to an embodiment disclosed herein.

Referring to FIG. 6, the terminal device 100 receives information corresponding to an emotional state (S610). Then, the terminal device 100 controls the haptic unit to provide the user with a haptic effect of the emotional state corresponding to the received information (S620).

In this case, a recording medium including a program for executing the method may be stored and used in the existing terminal devices. Accordingly, a haptic effect may vary depending upon performance of each terminal device. According to an embodiment disclosed herein, the terminal device 100 may determine at least one of the frequency, strength, wavelength, and rhythm in which the haptic unit may operate. The terminal device 100 may control the haptic unit to provide the user with a hactic effect of an emotional state corresponding to the received information (target emotional state), based on the determined result.

The terminal device 100 may determine an emotional state of an image, an emotional state of sound, and an emotional state of a haptic effect. Further, the terminal device 100 may provide the user with a complex stimulus consisting of at least one combination of a visual stimulus, an auditory stimulus, and a tactile stimulus. The operations were described in detail in the above embodiments, and thus, a repeated description will be omitted.

As described above, according to various embodiments disclosed herein, the terminal device may enable an interaction between a user and a device in a real sense, that is, an interaction that may affect a user's emotion, going beyond a role of providing a notification.

Meanwhile, the methods according to the above-described embodiments may be programmed and stored in diverse recording media. Accordingly, the methods may be realized in various kinds of electronic devices that run the recording media.

Specially, according to an embodiment disclosed herein, in order to control a terminal device that includes a haptic unit for providing a haptic effect by changing at least one of frequency, strength, wavelength, and rhythm, a non-transitory computer readable medium, including a program for sequentially executing operations of receiving information corresponding to an emotional state and controlling the haptic unit to provide a user with a haptic effect of the emotional state corresponding to the received information, may be provided. The non-transitory computer readable medium may be installed in various devices.

The non-transitory computer readable medium refers to a machine-readable medium that stores data permanently or semi-permanently unlike a register, a cache, or a memory that stores data for a short time. Particularly, the programs for executing the above-described various methods may be stored in and provided through the non-transitory computer readable medium, such as, a Compact Disc (CD), a Digital Versatile Disk (DVD), a hard disk, a Blu-ray disk, a Universal Serial Bus (USB), a memory card, a Read-Only Memory (ROM), or the like.

Accordingly, the above-described program may be installed in various kinds of existing terminal devices, and the terminal device capable of inducing a user's emotion may be realized.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to a person having ordinary skill in the art.

What is claimed is:

1. An electronic device comprising:
   a haptic unit for providing a haptic effect by changing at least one of frequency, strength, wavelength, or rhythm;
   an input unit for receiving information corresponding to an emotional state;
   a display for providing an image; and
   at least one processor configured to:
   obtain feature data of the image provided on the display,
   identify an emotional state of the image based on the obtained feature data, and
   in response to identifying that there is a difference between the emotional state corresponding to the received information and the identified emotional state of the image, control the haptic unit to provide a user with a haptic effect for compensating for the difference while the image is provided on the display.

2. The device as claimed in claim 1, further comprising:
   a memory for storing information on a plurality of haptic conditions corresponding to a plurality of emotional states, respectively,
   wherein the at least one processor is further configured to control the haptic unit to provide the haptic effect based on the stored information.

3. The device as claimed in claim 1,
   wherein the emotional state is defined as a combination of a first parameter value indicating a degree of excitement and a second parameter value indicating a degree of pleasure, and
   wherein in response to a first parameter value defining the emotional state of the image being lower than a first parameter value defining the emotional state corresponding to the received information, the at least one processor is further configured to control the haptic unit to provide a haptic effect corresponding to an emotional state defined as a first parameter value between the first parameter value defining the emotional state of the image and the first parameter value defining the emotional state corresponding to the received information.

4. The device as claimed in claim 1, further comprising:
   a speaker for outputting sound,
   wherein the at least one processor is further configured to:
   obtain feature data of sound outputted through the speaker,
   identify an emotional state of the sound based on the obtained feature data, and
   in response to identifying that there is a difference between the emotional state corresponding to the received information and the identified emotional state of the sound, control the haptic unit to provide a haptic effect for compensating for the difference while the sound is outputted through the speaker.

5. The device as claimed in claim 1,
   wherein the emotional state is defined as a combination of a first parameter value indicating a degree of excitement and a second parameter value indicating a degree of pleasure, and
   wherein, in response to identifying that there is a difference between a second parameter value defining an emotional state of the haptic effect provided by the haptic unit and a second parameter value defining the emotional state corresponding to the received information, the at least one processor is further configured to control the display to provide an image corresponding to an emotional state defined as a second parameter value between the second parameter value defining the emotional state of the provided haptic effect and the second parameter value defining the emotional state corresponding to the received information.

6. The device as claimed in claim 1,
   wherein the input unit receives haptic contact information, and
   wherein the at least one processor is further configured to control the haptic unit to provide the user with the haptic effect based on the haptic contact information.

7. A method for controlling an electronic device with a haptic unit for providing a haptic effect by changing at least one of frequency, strength, wavelength, or rhythm, the method comprising:
   receiving information corresponding to an emotional state;
   providing an image;
   obtaining feature data of the image;
   identifying an emotional state of the image based on the obtained feature data; and
   in response to identifying that there is a difference between the emotional state corresponding to the received information and the identified emotional state of the image, controlling the haptic unit to provide a user with a haptic effect for compensating for the difference while the image is provided.

8. The method as claimed in claim 7, further comprising:
   storing information on a plurality of haptic conditions corresponding to a plurality of emotional states, respectively,
   wherein the controlling of the haptic unit comprises controlling the haptic unit to provide the haptic effect based on the stored information.

9. The method as claimed in claim 7,
   wherein the emotional state is defined as a combination of a first parameter value indicating a degree of excitement and a second parameter value indicating a degree of pleasure, and
   wherein, in response to a first parameter value defining the emotional state of the image being lower than a first parameter value defining the emotional state corresponding to the received information, the controlling of the haptic unit comprises controlling the haptic unit to provide a haptic effect corresponding to an emotional state defined as a first parameter value between the first parameter value defining the emotional state of the image and the first parameter value defining the emotional state corresponding to the received information.

10. The method as claimed in claim 7, further comprising:
    obtaining feature data of sound outputted by a speaker of the electronic device and identifying an emotional state of the sound based on the obtained feature data; and
    wherein, in response to identifying that there is a difference between the emotional state corresponding to the received information and the identified emotional state of the sound, the controlling of the haptic unit comprises controlling the haptic unit to provide a haptic effect for compensating for the difference while the sound is outputted.

11. The method as claimed in claim 7,
    wherein the emotional state is defined as a combination of a first parameter value indicating a degree of excitement and a second parameter value indicating a degree of pleasure, and wherein, in response to identifying that there is a difference between a second parameter value defining an emotional state of the haptic effect provided by the haptic unit and a second parameter value defining the emotional state corresponding to the received information, the method further comprises providing an image corresponding to an emotional state defined as a second parameter value between the second parameter value defining the emotional state of the provided haptic effect and the second parameter value defining the emotional state corresponding to the received information.

12. The method as claimed in claim 7, further comprising:

receiving haptic contact information, wherein the controlling of the haptic unit comprises controlling the haptic unit to provide the user with the haptic effect based on the haptic contact information.

13. The method as claimed in claim 7, further comprising:

obtaining information on the at least one of frequency, strength, wavelength, or rhythm in which the haptic unit operates, wherein the controlling of the haptic unit comprises controlling the haptic unit to provide the user with the haptic effect based on the obtained information.

* * * * *